(No Model.)

E. A. REED.
TABLE.

No. 438,947. Patented Oct. 21, 1890.

WITNESSES:

INVENTOR:
E. A. Reed
BY
Munn & Co.
ATTORNEYS

UNITED STATES PATENT OFFICE.

EDWARDS A. REED, OF OLIVER SPRINGS, TENNESSEE.

TABLE.

SPECIFICATION forming part of Letters Patent No. 438,947, dated October 21, 1890.

Application filed April 15, 1890. Serial No. 348,002. (No model.)

*To all whom it may concern:*

Be it known that I, EDWARDS A. REED, of Oliver Springs, in the county of Anderson and State of Tennessee, have invented a new and useful Improvement in Tables, of which the following is a full, clear, and exact description.

This invention relates to tables having folding legs; and it consists in a novel construction of the same, substantially as hereinafter described, and more particularly pointed out in the claims, and whereby while a stable construction for the table when in use is secured it economizes space in shipping, stowing away, or keeping in stock, and facilitates passing through doors or crooked and cramped passages, also makes a table of simple construction, the parts of which are easily put together, and the legs of which are not liable to shift from their adjustment, either when closed or let down.

Reference is to be had to the accompanying drawings, forming a part of this specification, in which similar letters of reference indicate corresponding parts in all of the figures.

Figure 1:
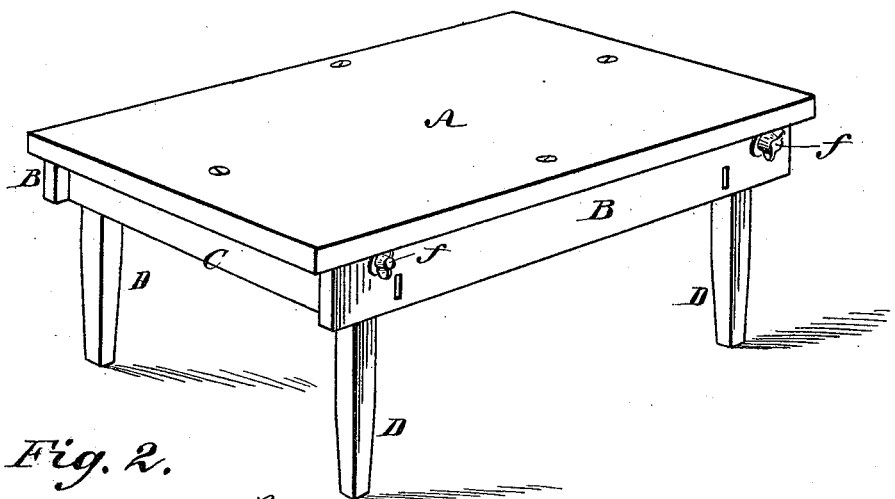
Figure 2:
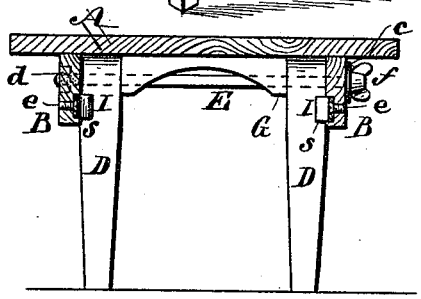
Figure 3:
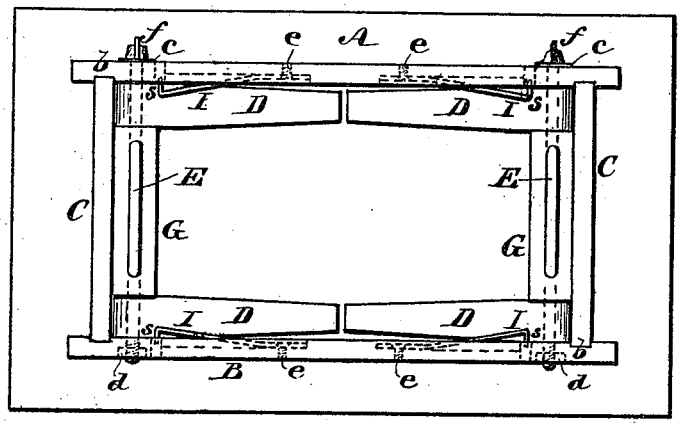

Figure 1 represents a view in perspective of a table embodying my invention, and as in a standing position. Fig. 2 is a transverse section of the same in a like position, and Fig. 3 is an inverted plan with the legs of the table folded in or closed up against the under side of the top.

A is the table-top, B B its side rails, and C C its end rails. The side rails are slightly rabbeted, as at $b$, to receive the end rails and to form a shoulder to sustain the latter when certain springs snap in position to hold the legs of the table when set up.

D D are the legs, which are fitted to turn at their upper ends on transverse bolts E E, arranged to extend through both side rails B B and through end blocks G G on the inside of the end rails C C intermediate of the legs on opposite sides of the table. The bolts E E may have a thumb-nut head $f$ or any other suitably-shaped head on their one end outside of the one side rail B, with a washer $c$ on the inner face of their head, and screw at their opposite end into a nut $d$, adjacent to the other side rail C, or let into such side rail, so as to be held by it, in order that either bolt E may be tightened up or slackened and thereby cause the side rails to bind or release the legs D D, which work on the bolts E E, between the blocks G G and the side rails B B.

There is no necessity to apply nails or screws or to mortise the rails of the table at their junction with one another, as the bolts E E will tightly hold such parts, and on slightly loosening said bolts the legs D D can be turned down or up very easily. The upper ends of the legs D should be rounded so as not to strain upon the top A, which may be fastened by screws or otherwise to the side and end rails.

Fastened to the side rails on their inner side—as, for instance, by screws $e$—are a series of snap-springs or elastic catches I I—one for each leg D. These snap-springs run longitudinally of the side rails and are of such length that their free ends, which may be bent to form lips $s$, bind on the sides of the legs opposite either adjacent end rail C when the legs are turned down to occupy a vertical or standing position, and thus serve in connection with the end rails and the side rails B and intermediate blocks G on tightening up the bolts E E to hold the legs of the table solid and steady. By closing or compressing the free ends $s$ of the springs, which are free to enter apertures in the side rails, the legs D D may be turned of closed inward on the bolts E E, so as to lie close throughout their length to the side rails B B and there be locked by the springs, as shown in Fig. 3, as the legs in shutting them up pass the springs, which are almost free from wear, on the legs. The bolts E E may also be tightened up to hold the legs firm in their closed position. When the table is of suitable length, then the legs when closed do not meet; but in the case of a short table the legs, to give proper height to it, may when closed lap one over the other.

Ordinarily there will be no necessity to take the table apart after it leaves the factory where it was made.

The invention though here only shown as applied to a comparatively short table having but four legs is equally applicable to longer tables provided with a greater number of folding legs, such as dining-room tables and counters or long tables for use in stores or elsewhere.

Having thus fully described my invention, I claim as new, and desire to secure by Letters Patent—

1. A table consisting in the top A, parallel longitudinal rails B, secured to its lower side and connected at their ends by transverse rails C to form a rectangular frame, a transverse block G G inside of said frame at the ends thereof and of less length than rails C, legs D, mounted in corners of the frame at the ends of said blocks, and a single long bolt E for each pair of legs, passing through the frame from side to side thereof and through the legs and blocks, and a clamping-nut on the threaded ends of each bolt, substantially as set forth.

2. As an improved article of manufacture, a table consisting in the top A, the longitudinal rails B, and end rails C on the lower face thereof, the blocks G, secured to the lower face of the table-top adjacent inside of its end rails and of less length than said rails, a leg in each of the four spaces at the ends of the said blocks, bolts passed through the side rails, the legs, and blocks and provided with nuts for clamping the legs in their folded or extended positions and longitudinally-extending catches on the inner faces of the side rails to supplement the bolts and nuts and hold the legs in their folded or extended positions, substantially as set forth.

EDWARDS A. REED.

Witnesses:
H. P. FARMER,
A. L. GARDNER.